April 22, 1969  G. B. STILLWAGON, JR  3,439,413
METHOD FOR PRODUCING DRIVING TOOLS FOR RECESSED HEAD FASTENERS
Filed Dec. 2, 1966
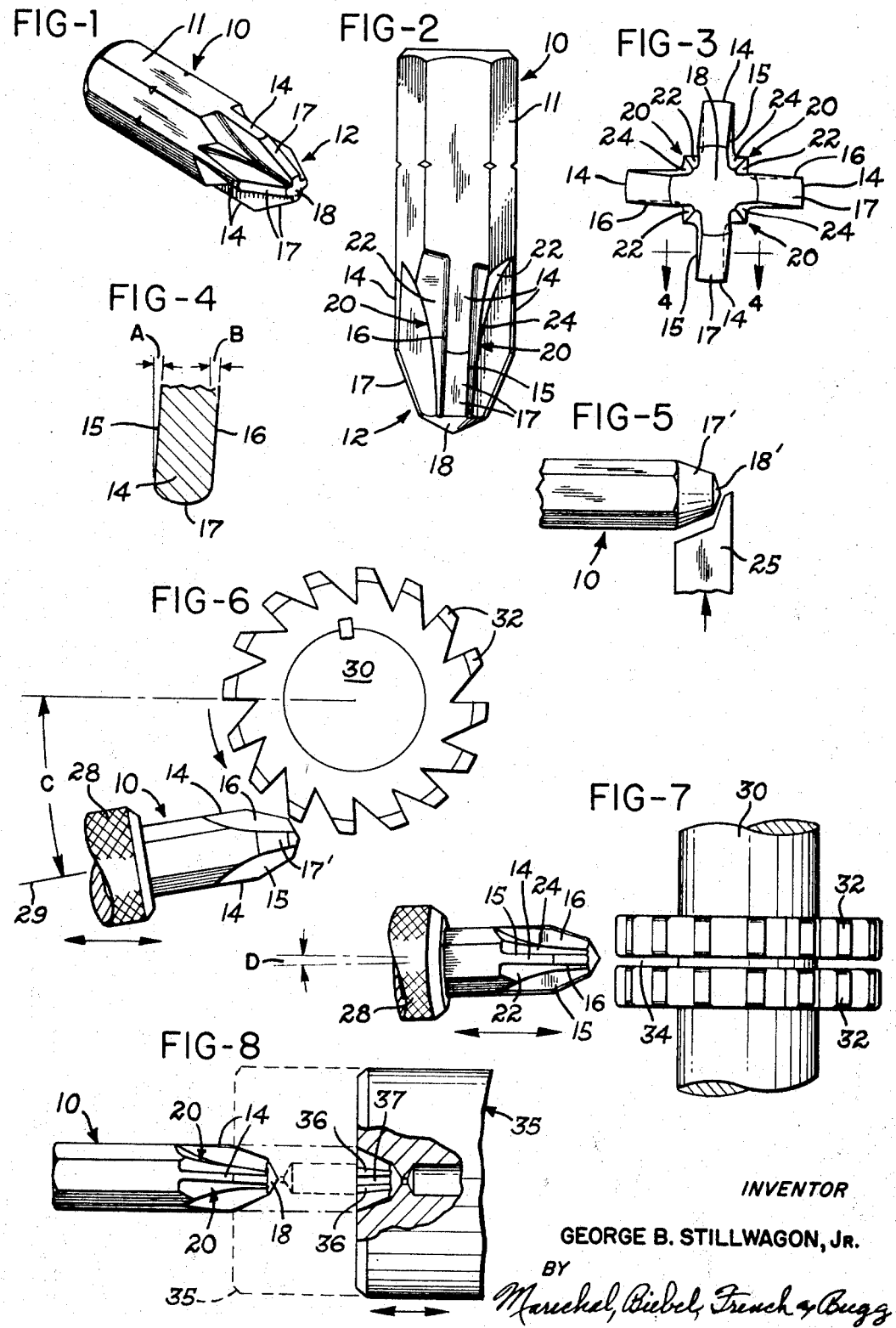
INVENTOR
GEORGE B. STILLWAGON, JR.
BY
Marechal, Biebel, French & Bugg
ATTORNEYS United States Patent Office 3,439,413
Patented Apr. 22, 1969

3,439,413
METHOD FOR PRODUCING DRIVING TOOLS FOR RECESSED HEAD FASTENERS
George B. Stillwagon, Jr., Dayton, Ohio, assignor to Gardner-Denver Company, Dayton, Ohio, a corporation of Delaware
Filed Dec. 2, 1966, Ser. No. 598,744
Int. Cl. B23p 13/04; B23g 9/00
U.S. Cl. 29—558    4 Claims

ABSTRACT OF THE DISCLOSURE

A driving bit of the type having drive wings and intermediate ridges for driving fasteners having similarly formed recesses is made by straddle milling to form in the bit stock the approximate face angles of each of the drive wings and to form the adjacent surfaces of each of the adjacent ridges, followed by the sizing of the driving end of the bit to the finished dimensions.

Summary of the invention

This invention relates to drivers for recessed head fasteners, and more particularly, to an improved method for forming the recess-engaging end portion or nib of a driving tool.

The present invention has special relation to the production of driving tools having wings and ridges such as disclosed in United States Patent No. 3,238,540. That is, the present invention is particularly directed to a method for forming on the end portion of a driving tool a plurality of at least three equal angularly spaced tapered wings and intermediate tapered ridges each having angularly disposed surfaces.

A common method of forming the tapered wings and ridges on such a bit for a recessed head fastener is first to point the bit by forming a generally conical end surface on the bit. Equally spaced valleys or straight flutes are then successively milled into the end portion of the bit and the milling cutter is so formed to provide a flat at the bottom of each flute. The angularly disposed surfaces forming the tapered ridges are then produced by a coining operation.

To provide the precise configuration of the wings and ridges as shown in the Patent No. 3,238,540, it has been found desirable to repoint the bit following the first coining operation due to the fact that substantial metal must be moved to form the ridges from the flats and this metal displacement distorts the tapered end surfaces of the wings. Furthermore, it has also been found necessary to follow the repointing operation with a second coining operation to assure the precise configuration of the wings and ridges on each bit.

Accordingly, it is a primary object of the present invention to provide an improved method for forming a plurality of at least three tapered wings and intermediate tapered ridges on the end portion of a driving tool and thereby reduce the number of successive operations required to produce the tool.

A more specific object of the invention is to provide a method wherein a wing of uniform wall thickness and a ridge surface on each side of the wing are formed simultaneously by straddle milling the end portion of the tool with parallel spaced milling cutters while maintaining an inclined relationship between the axis of the tool and the direction of relative movement between the tool and the cutters.

As another object, the present invention provides an improved method for forming a driving tool for recessed head fasteners as outlined above, and including successive straddle milling operations which are performed while the axis of the tool is inclined to a plane normal to the rotatable axis of the milling cutters for producing an undercut wall surface on each of the wings.

Still a further object of the invention is to provide a method as outlined above and including a coining operation which is performed after the milling of the wings and ridges for tapering each wing longitudinally to reduce its wall thickness towards the end of the tool.

Other objects and advantages of the invention will be apparent from the following description, the accompanying drawing and the appended claims.

In the drawing:

FIG. 1 is an enlarged perspective view of a driving tool bit constructed in accordance with the present invention;

FIG. 2 is an enlarged side view of the bit shown in FIG. 1;

FIG. 3 is an enlarged end view of the end portion of the bit shown in FIGS. 1 and 2;

FIG. 4 is a section taken generally along the line 4—4 in FIG. 3;

FIG. 5 is an enlarged view of the bit and a machining tool showing a pointing operation;

FIG. 6 is an enlarged view of the bit supported in a chuck and an end view of a set of spaced milling cutters for illustrating the forming of a wing and adjacent ridge surfaces;

FIG. 7 is a top view of the bit and milling cutters shown in FIG. 6; and

FIG. 8 is an enlarged side view of the bit and a coining die with a portion of the die broken away.

Referring to the drawing which illustrates a preferred embodiment of the invention, FIGS. 1-3 show a tool bit 10 which is constructed from hexagonal bar stock in accordance with the method of the invention. The bit includes a shank portion 11 and a driving nib or end portion 12 which includes four angularly arranged and equally spaced wings 14 each having flat driving and extracting face surfaces 15 and 16 connected by a tapered end surface 17. A slight conical tip surface 18 forms the forward end of the bit.

As shown in FIGS. 2 and 3, each of the wings 14 extends at a slightly inclined angle in relation to a plane passing through the axis of the bit so that the driving face surface 16 is somewhat undercut, and as illustrated in FIG. 4, the surfaces 15 and 16 taper slightly together towards the tip surface 18. That is, the drive surface 15 extends at an angle A in relation to a plane parallel to the axis of the tool and the opposite surface 16 extends at a lesser angle B in relation to the plane. Typical values for the angles A and B are approximately 2°–0′ and 22′, respectively, thus producing a longitudinal taper between the surfaces 15 and 16 of approximately 1°–38′.

Tapered ridges 20 extend between the face surfaces 15 and 16 of adjacent wings 14 and each ridge forms elongated generally triangular surfaces 22 and 24 which are disposed substantially perpendicular to each other and converge towards the end of the bit.

Referring to FIGS. 5–8, which illustrate a preferred method performed in accordance with the invention for producing a bit as shown in FIGS. 1–3, the tapered wings 14 and intermediate ridges 20 are formed by first pointing the bit, as for example, by a tool 25 (FIG. 5) mounted on a screw machine (not shown) which cuts the bit to a predetermined length from hexagonal bar stock. The pointing operation produces a frusto-conical surface 17′ corresponding to the wing surfaces 17 and a slight conical end surface 18′ corresponding to the tip surface 18.

As the next operation, the bit 10 is inserted in a collet 28 (FIG. 6) of a horizontal milling machine (not shown) which is adapted to rotate the collet on an axis 29 and supports the collet for reciprocable movement in a horizontal direction as shown by the arrow. The collet 28 is positioned so that its axis 29 and the coextensive axis of the bit retained therein, form an angle C with a horizontal plane extending through the axis of an arbor 30 supporting parallel spaced cutters 32. A typical angle C is approximately 10½°.

The end portion of the bit 10 is moved into engagement with the cutters 32 and the space or gap 34 (FIG. 7) between the cutters results in forming a wing 14 having parallel face surfaces 15 and 16. The remaining three wings are successively formed by retracting the bit from the cutters and repeating the milling operation after the collet 28 is indexed 90°.

The collet 28 is positioned so that the end portion of the bit is located in precise vertical relationship with the bottom peripheral surface of the cutters 32 during each pass of the bit into engagement with cutters. As a result, the cutters form ridge surfaces 22 and 24 on opposite sides of a wing 14 simultaneously with the forming of the wing.

Referring to FIG. 7, the collet 28 and bit 10 are positioned during the forming of the wings 14 so that the coextensive axes of the collet and bit form a slight angle D with a plane perpendicular to the axis of the arbor 30. As a result, the milling of each wing produces parallel side surfaces 15 and 16 extending at an angle D in relation to a plane passing through the axis of the bit. A typical angle D is approximately 1½°.

After the successive straddle milling of the wings 14 which results in each wing having a uniform wall thickness, the end portion of the bit is coined to a precise configuration by a die 35 (FIG. 8) which is pressed axially against the end portion of the bit while the bit is confined within a collet (not shown). The die 35 includes a cavity having a series of grooves 36 each having the precise configuration of a ridge 20 and which are spaced between a series of tapered slots 37 each having opposing faces which are slightly tapered in relation to each other to form the longitudinal tapered relationship mentioned above between the corresponding side surfaces 15 and 16 of each wing 14.

From the drawing and the above description, it can be seen that by employing the method the present invention for constructing driving tools such as shown in the above mentioned patents, several desirable features and advantages are provided. Basically, by employing a straddle milling operation to form each of the wings 14, the adjacent tapered ridge surface on each side of the wing can be formed simultaneously with the forming of the wing.

Furthermore, the method of the present invention forms the equally spaced tapered wings and at the same time defines the surfaces of the intermediate tapered ridges, and one of the surfaces of the wings can be made either substantially close or precisely at the desired configuration, and the ridges which are defined simultaneously with the milling of the wings can be formed with an exceedingly close approximation to the final desired form, so that only one subsequent coining or sizing operation is required to bring the final dimensions of the driving portion of the bit into precise configuration with the desired specifications. Additionally, the closely approximated surfaces of the wings and ridges are formed without the necessity of rechucking the bit once it has been chucked in place, and accordingly all errors which are incident to removing and rechucking are eliminated. With a single pair of straddle milling cutters, as shown in FIGS. 6 and 7, the bit can thus be formed by making only four passes of the tool while indexing the tool through 90° following the first, second and third passes. However, it is within the scope of this invention to use a duplicate pair of cutters 32 for forming the diametrically opposed wing in a cruciform type of bit, thus requiring only two passes and a single 90° index.

While it is preferable to form one of the face surfaces 15 and 16 to the final specification during cutting, and then forming the opposite surface to its precise configuration during the sizing step, it is also within the scope of this invention to establish the angle D in FIG. 7 so as to fall somewhere between the finished angular relationship of the opposed faces, and then finish each of the faces to the exact configuration during sizing. In either case, only a small amount of metal is displaced during the coining or sizing operation with the result that no additional repointing or resizing is necessary to bring the tool to its final specifications. Accordingly, the method of this invention enables driving tools, such as the bit shown, to be produced with high accuracy and with significantly less cost by eliminating some of the handling and forming operations, and thus eliminating further the changes or errors and misalignment during the cutting steps.

While the method herein described constitutes a preferred embodiment of the invention, it is to be understood that the invention is not limited to this precise method, and that changes may be made therein without departing from the scope of the invention which is defined in the appended claims.

What is claimed is:

1. An improved method for forming a plurality of at least three equiangularly spaced tapered wings and intermediate tapered ridges having angularly disposed surfaces on the end portion of a rotatable driving tool, comprising the steps of forming a tapered end surface on said tool, milling the end portion of said tool with parallel spaced rotating cutters to form a wing having a uniform wall thickness, maintaining a predetermined inclined relationship between the rotational axis of said tool and the direction of relative movement between said tool and said cutters during the forming of said wing for simultaneously forming a ridge surface on each side of said wing, and indexing said tool on its axis of rotation and repeating said milling operation for successively forming said wings and adjacent ridge surfaces.

2. A method as defined in claim 1 wherein said cutters are mounted on a common arbor, and including the step of maintaining the axis of said tool on a slight angle with a plane normal to the axis of said arbor during the milling of each said wing for forming an undercut wall surface on each said wing.

3. A method as defined in claim 1 including the step of coining the end portion of said tool after the milling of said wings and said ridges for tapering said wings to reduce the wall thickness of each said wing adjacent the end of said tool.

4. A method as defined in claim 1 wherein each said cutter has a cylindrical outer configuration, and said forming of a tapered end surface on said tool includes the initial operation of forming a frusto-conical surface on said end portion of said tool.

References Cited

UNITED STATES PATENTS

| 1,695,955 | 12/1928 | Frayer | 29—558 |
| 2,559,621 | 7/1951 | Hill | 29—558 X |
| 2,661,663 | 12/1953 | Brinkman | 29—557 X |
| 3,028,781 | 4/1962 | Muenchinger | 10—7 X |
| 3,166,769 | 1/1965 | Wieber | 10—7 X |
| 3,238,540 | 3/1966 | Muenchinger | 10—7 |

JOHN F. CAMPBELL, *Primary Examiner.*

P. M. COHEN, *Assistant Examiner.*

U.S. Cl. X.R.

10—7